United States Patent
Weislehner

[11] 4,021,194
[45] May 3, 1977

[54] INSTALLATION FOR THE DE-DUSTING OF HOT GASES

[75] Inventor: Gustav Weislehner, Dotternhausen, Germany

[73] Assignee: Portlandzementwerk Dotternhausen Rudolf Rohrbach KG, Balingen, Germany

[22] Filed: Nov. 22, 1974

[21] Appl. No.: 526,410

[30] Foreign Application Priority Data
Dec. 17, 1973 Germany .......................... 2362622

[52] U.S. Cl. .................................. 432/78; 55/269; 55/385 R; 165/5; 165/7
[51] Int. Cl.[2] ......................................... F27D 15/02
[58] Field of Search ............ 55/261, 267, 269, 315, 55/381, 385, DIG. 41, 268; 432/16, 67, 78, 80, 100; 165/5-7, 8, 9

[56] References Cited
UNITED STATES PATENTS

| | | | |
|---|---|---|---|
| 480,834 | 8/1892 | Sheedy | 55/381 |
| 1,022,496 | 4/1912 | Muller et al. | 55/261 X |
| 1,843,639 | 2/1932 | Hansen | 55/381 X |
| 2,041,142 | 5/1936 | Norvig | 432/67 |
| 2,932,362 | 4/1960 | Roper | 55/381 |
| 3,469,828 | 9/1969 | Lane | 432/67 |
| 3,568,758 | 3/1971 | Kelley | 165/6 |
| 3,587,723 | 6/1971 | Norback | 165/9 |
| 3,651,862 | 3/1972 | Ballinger | 165/6 X |
| 3,836,321 | 9/1974 | Okada et al. | 432/80 X |

*Primary Examiner*—Frank W. Lutter
*Assistant Examiner*—David L. Lacey

[57] ABSTRACT

An installation for the de-dusting of hot gases, in particular the exhaust air of product coolers for cement, lime and dolomite furnaces or similar furnaces, in which the hot gases are conveyed from an exhaust gas chamber, cooled in the presence of fresh air, and then conducted into a web or fabric filter for the de-dusting thereof.

3 Claims, 5 Drawing Figures

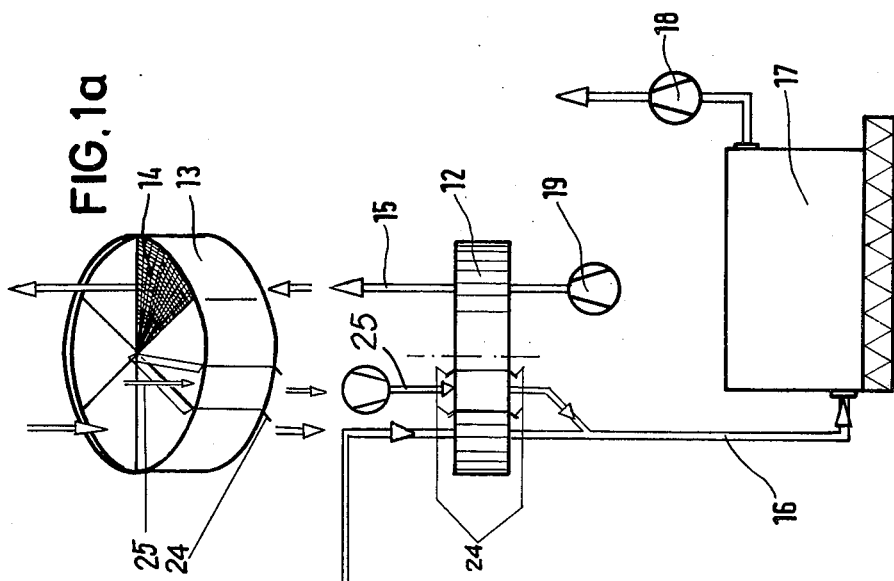
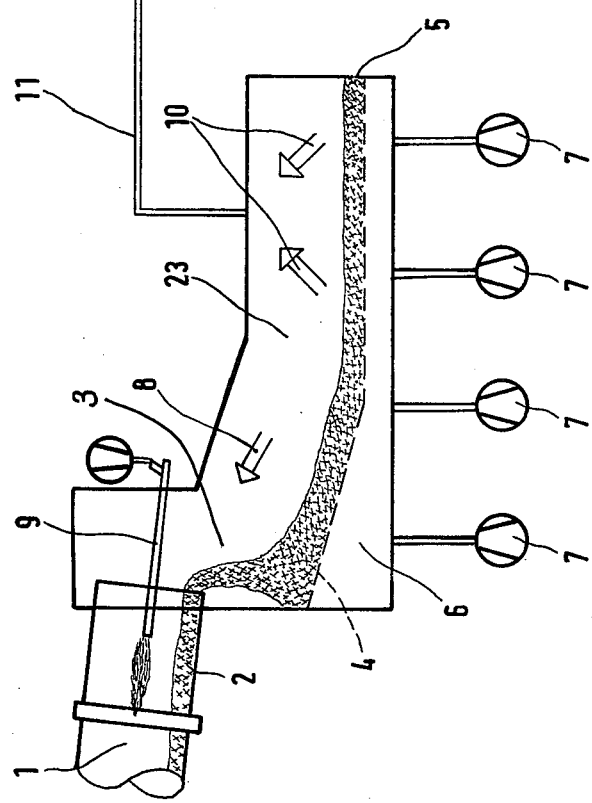

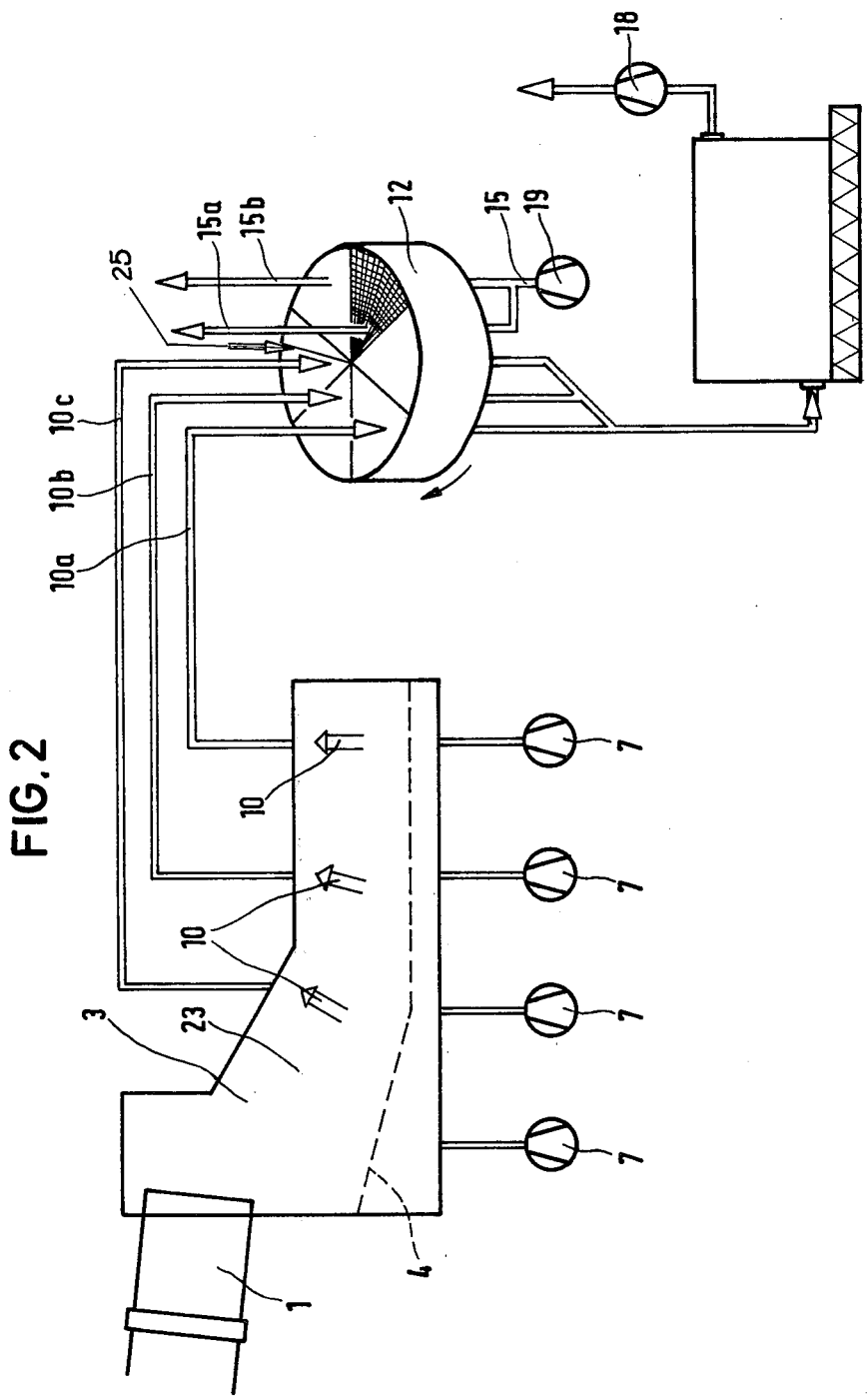

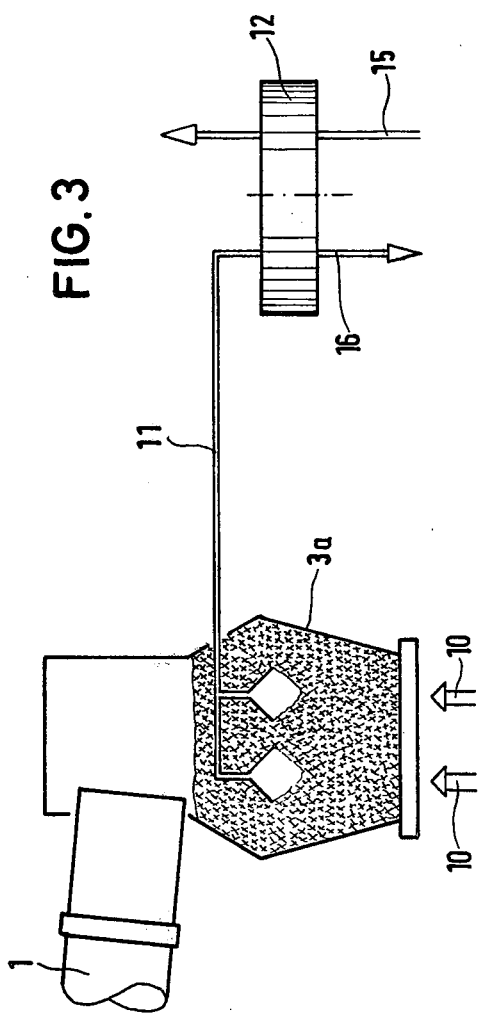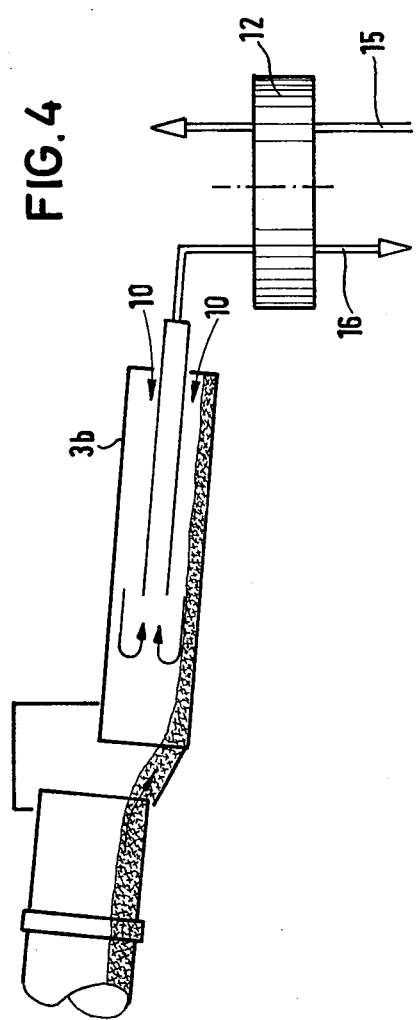

INSTALLATION FOR THE DE-DUSTING OF HOT GASES

FIELD OF THE INVENTION

The present invention relates to an installation for the de-dusting of hot gases, in particular the exhaust air of product coolers for cement, lime and dolomite furnaces or similar furnaces, in which the hot gases are conveyed from an exhaust gas chamber, cooled in the presence of fresh air, and then conducted into a web of fabric filter for the de-dusting thereof.

DISCUSSION OF THE PRIOR ART

In order to fulfill the requirements for maintaining the cleanliness of the air it is known, particularly in the cement industry, for example, to employ cooling units behind rotary furnaces, which operate without exhaust air. However, in those types of cooling units there are encountered difficulties, in particular at large rates of flow or throughput, with respect to obtaining an adequate extent of cooling.

Furthermore, the recovery of warmed air which may be employed, for example, for drying purposes, is not possible.

The construction of these known cooling units or installation has been considerably neglected for some years, and particularly in connection with heat saving cement furnaces. In more recent times, these cooling units have again been built, notwithstanding the above-mentioned disadvantanges and constructional difficulties, since the de-dusting of exhaust gases has not been satisfactorily resolved by means of other systems.

In coolers which operate with exhaust air, for example, clinker or vitrified brick coolers in the grating construction, for example, step- or traveling grate, there are known cyclone separators for de-dusting which are, however, no longer adequate for the increasingly higher requirements for maintaining the cleanliness of the air. Furthermore, for the de-dusting of hot gases there are also known gravel-bed filters and web or fabric filters. Gravel-bed filters can readily take the higher temperatures of the exhaust air which occur during the de-dusting of the exhaust air through coolers, which in the normal instance may consist of 160° to 250° C., and in disturbance or faulty instances may increase to over 400°, nevertheless, for extremely high peak temperatures there must be employed special work materials for their construction.

At high temperatures of up to 350°, there may also be employed web or fabric filters, when these are provided with special filter cloths which are formed of fiberglass or similar materials. In order to be able to absorb temperature peaks which exceed these values, fabric filter installations of known types, however, require either the mixing in of fresh air which, in the known installations, requires a considerable increase in the size of the installation, or the venting of unpurified or contaminated air into the atmosphere, which is contradictory to the requirements for maintaining the cleanliness of the air. At the mixing in of fresh air, the temperature level may namely be lowered to such an extent, so that also less expensive filters can be utilized. However, the herewith need increase in the size of the installation causes a space requirement which is approximately doubled due to the quantity of exhaust air. Another fundamental disadvantage of this solution lies in that the blowers which aspirate the dust-containing gases from the exhaust chamber must be driven at a high temperature.

Thus, the de-dusting arrangement, as well as the blower, is designed for a predetermined volumetric flow. However, for determination of the cooling effect, of significance is the quantity of the cooling medium.

When the de-dusting arrangement if designed for the largest volumetric flow occurring at temperture peaks, there then result large and consequently expensive installations, which operate throttled in the normal instance and are thereby not fully utilized.

When the installation is designed for normal operation then, at the occurring temperature peaks, uncleaned exhaust gas must be ejected over the roof.

The cooling of the exhaust gas with the aid of a recuperator which is driven with fresh air requires a large heating or convection surface and, since good heat conductance from the exhaust gas to the fresh air across the heating surface is achieved only at a corresponding speed, leads to wear-prone heat exchange surfaces.

SUMMARY OF THE INVENTION

Accordingly, in contrast with the foregoing, the present invention has as its object to provide an installation for the de-dusting of hot gases, particularly the exhaust gas of coolers, which allows the temperature of the exhaust gas of a cooler to be lowered, even at temperature peaks, to such an extent so that there may be employed fabric filters for the de-dusting, respectively, cleaning of the exhaust gas of a cooler, which have a small space requirement, and which may be provided with hoses formed of wool, cotten or plastic fibers, for example, polyester, polyacryl and the like. Thereby, the installation may be so arranged as to necessitate only the conveyance of pure or cleansed, low-temperature air in order to save power in the driving of the blowers, and to maintain wear at a minimum. Through the installation it also becomes possible to reduce operationally required temperature peaks without the need to incorporate the above-mentioned disadvantages of the prior art.

In addition thereto, it is contemplated, by means of specialized switching of the exhaust gas streams from the coolers which operate in transverse flow, to maintain the required fresh air quantity for the cooling of these exhaust gas streams at a low value; this being obtained, for example, in that the exhaust gas streams are so divided as to be obtained at different temperature levels and utilized for the stepwise heating of a storage mass so that the latter can be raised to a higher temperature than through the use of an undivided-mixed exhaust gas stream.

The fresh air flow required for the recooling of the storage mass can thereby be raised to a higher temperature level, and at the same heat quantity which is to be removed, the cooling air flow can be maintained lower.

The implementation of the object of this invention by means of an installation of the above mentioned type consists of in that the exhaust gas chamber is connected with a regeneratively operating heat exchanger constructed of, for example, a slowly rotatable drum and which has a plurality of heat exchange or convection surfaces located therein, having connected thereto through hoses or cloths, fabric filters of usual filter material such as wool, cotton, or plastic materials, and wherein approximately 50% of the area of the entire heat exchange surfaces is streamed through by the hot gases, respectively, the exhaust gas and the remaining area by a cooling fresh air flow.

In an installation which is constructed in this manner pursuant to the invention, there is afforded the advantage that a heat exchanger is employed which is practically fully resistant to wear, and if wear of the heat exchange surfaces is encountered, these may be inexpensively and easily replaced.

Crossing over of dust-containing exhaust gas towards the cooling air side is prevented by means of suitable seals, as well as rinsing-through with air of the heated heat exchange surfaces, whereby the last-mentioned air quantity may be held small and admixed with the exhaust gas.

A crossing over of cooling medium caused by wear, for example, in water coolers, is thus extensively precluded. Thereby, through the use of a regeneratively operating heat exchangers of the above-mentioned type, which heretofore preponderantly belonged to firing installations utilized for the preheating of combustion air, there is achieved in a surprising manner that even at high temperatures of the exhaust gases or exhaust air of the cooler of up to about 400°, and alone at temperature peaks up to 550° as may occur during operating disruptions, there is possible an extensive cooling of the exhaust gases, respectively, exhaust air. The storage mass of the regeneratively operating heat exchanger may be so calculated, that temperature peaks caused by process conditions or disruptions can be absorbed so as to lead to only a minute, permissible temperature rise in the gas which is to be cooled. The hereby additionally introduced heat quantity is then conducted away by means of the cooling air which is arranged in counterflow. The direct admixing of cold air to the hot gases, in effect, to the heated exhaust gas, thus becomes unnecessary. The extent of cooling which is achieved by means of the heat exchanger thereby is so large, that there may be used, in connection with the heat exchanger, generally known and evaluated dedusting installations in the form of fabric filters having cloths of the above-mentioned common or usual filter materials which have a high effective degree and provide a dust content in the purified gas of less than 50 to 75 mg/m$^3$, calculated for a gas condition at a pressure of 760 mm Hg and a temperature of 0° C. Since the dust-charged hot gases, respectively, the dust-charged exhaust gas in toto pass through the heat exchanger and the thereto connected hose filter, and does not there come into direct contact with the essentially dust-free fresh air in the heat exchanger, it is extensively precluded that the dust-charged, respectively, uncleaned air can reach the atmosphere. Much more readily, the purified air and, upon occasion, the fresh air conducted through the heat exchanger can flow into the atmosphere. This fresh air need be employed in only a small quantity, but is raised to a high temperature in the heat exchanger then may be employed as heated air having a high degree of purity at other locations, so as to avoid the danger of any depositions along the path of conveyance to such locations of usage.

When the inventive installation is utilized in connection with an elongate cooler operating with cooling air in cross or transverse flow, in which the introduced cooling air is heated to a temperature which reduces to that of the outlet portion of the cooler, then in accordance with a further feature of the invention, the exhaust chamber of the cooler may be connected to a plurality of independent, mutually spaced tube conduits along the longitudinal direction of the heat exchanger, which convey to the heat exchanger a plurality of exhaust air streams of different temperatures, so that the heat exchange surfaces of the heat exchanger, upon rotation of the latter, first come into contact with the lowest-temperatured and finally with the highest-temperatured exhaust air from the cooler. Since the temperature of the final air streaming through the heat exchanger is higher than the mixture temperature of the collective exhaust air, the storage volume is collectively raised to a higher temperature level. This allows the need for the fresh air quantity for the heat exchanger to be maintained low, with this fresh air quantity being, however, more highly heated, which may be of advantage for its possible further utilization.

Suitably, blowers may be provided for the cooling exhaust air and for the fresh air, which are subjected to a cold medium. There is herewith obtained the advantage that the volumetric flow, and consequently the power requirements, can be maintained low.

Furthermore, the heat exchanger may be provided with a sealing arrangement and/or an inflow or rinsing or circulating air, which prevents the dust which is contained in the gases being cooled from reaching the heat-absorbing fresh air flow which is conducted into the heat exchanger.

In all embodiments of the invention, for the continued utilization of the fresh air which is heated in the heat exchanger, there may be provided a blower for effecting a pressure increase without causing any excessive wear.

BRIEF DESCRIPTION OF THE DRAWINGS

Reference may now be had to the following detailed description of exemplary embodiments of the invention, taken in conjunction with the accompanying drawings; in which:

FIG. 1 diagrammatically illustrates a first embodiment of an installation of an invention for a griddle cooler for vitrified cement blocks or clinkers.

FIG. 1a perspectively shows a heat exchanger used in the installation of FIG. 1;

FIG. 2 shows a second embodiment of the installation similar to that of FIG. 1;

FIG. 3 shows a portion of the installation of either FIG. 1 or 2 in combination with a stratifying cooler; and FIG. 4 shows a portion of the installation of either FIGS. 1 or 2 in combination with a drum cooler.

DETAILED DESCRIPTION

Referring now to the embodiment shown in FIG. 1 of the drawings, the completed fired clinkers 2 emanating from a rotary tube furnace 1 are conveyed at a temperature of 1200° to 1500° C. into the infeed portion of an elongate griddle or, respectively, cross-flow cooler 3 and onto a cooling grill 4 located therein, which is in the shape of a swinging grill. Due to the swinging movement of the cooling grill 4, the product or material 2 which is being cooled moves towards the exit 5. Hereby, the cooling product is cooled down to such a temperature by means of cool fresh air 6 which is introduced through the blowers 7, that the further conveyance thereof becomes feasible through the intermediary of usual conveying apparatus. The fresh air 6, which is transmitted to the grill cooler 3 flows through the cooling product 2 and is warmed thereby whereby the heating in the area of the inlet portion reaches approximately 800° C., and then drops off toward the outlet portion of the grill cooler 3 to a temperature of about 100° C. From the thus heated fresh air quantity which enters the chamber 23 of the grill or grate cooler, the hotter part is employed as combustion air 8 for the rotary furnace firing, whereas the excess air quantity 10, whose part constitutes about 50% of the total air quantity introduced through the blowers 7, is removed through the conduit 11.

According to the invention, this excess exhaust air is conducted out the exhaust chamber 23 by means of, for example, a tube conduit 11, and then conducted towards a known per se regeneratively operating heat exchanger 12, which may correspond to the type of "Ljungstrom heater. Such a heat exchanger, essentially, consists of a slowly rotating drum 13, which is provided with a suitable number of heat storage plates for the formation of heat convection surfaces 14. This exhaust gas passes through the heat exchanger in an axial direction within an area encompassing approximately 50% of the basic surface of the heat exchanger. Hereby the heat quantity is withdrawn from the through-passing exhaust air flow, by means of the heat storage plates, which is necessary in order to attain the desired exhaust air temperature. Upon further rotation of the drum 13, the plates which are heated by the exhaust air flow deliver the stored heat quantity to a cooling air flow 15 which flows in opposition to the exhaust air flow, which is produced by the blower 19. Thereby, measures may be met in which there is avoided the dragging along of dust from the heating to the cooling zone. Preferably, the heat exchanger may herewith be provided with a sealing arrangement 24 and/or an infeed for rinsing air 25, which will prevent movement of dust entrained in the exhaust air stream to be cooled into the cooling air flow 15. The air of the heat-absorbing cooling air flow may then be conveyed, without any intermediate connection of an auxiliary filter, for further utilization, or alternatively vented into the atmosphere.

The dust-containing exhaust air, which is cooled upon passage through the heat exchanger 12, is then conducted through the tube conduit 16 into a hose filter 17 which, in a known manner, is provided with hoses formed of either wool, cotton, plastic fibers, for example, polyester or polyacryl fibers, and the like. The blower 18 which is located downstream of the tube filter 17 overcomes the overall pressure drop, and pushes the cleansed exhaust air out into the atmosphere.

The embodiment of the de-dusting installation illustrated in FIG. 2, comprises an improvement which is attained in that the excess exhaust air 10 coming from the cooler 10 is divided into two or more, for example, three differently temperatured partial air streams 10a, 10b and 10c. These partial air streams are so conducted towards the heat exchanger 12 as viewed in the direction of rotation that first the air stream 10a at the lowest temperature, then the next higher temperature air stream 10b, and finally the highest temperature air stream 10c passes through the heat storage plate jacket. In this manner, the quantity of the heat absorbing cooling air flow 15 which is conveyed in by means of the blower 19 may be reduced, and it may be attained that this air stream is subjected to a higher temperature increase upon passing through the heat exchanger, which is of advantage for any further utilization of the exhaust air. Also the cooling air flow 15, as shown in FIG. 2, may be divided into partial streams 15a, 15b, which are received at different temperature levels.

In the remaining essentials the embodiment of FIG. 2 corresponds to that of FIG. 1. Since in both embodiments the blower 18 must convey extensively cooled exhaust air and the blower 19 cold ambient air, the quantitative conveyance volumes for the power output requirements of the blowers are smaller than those for known de-dusting installations in which the blower operates in an uncooled, hot air flow. Hereby, the energy requirement of the blowers 18 and 19 together is at most within the magnitude of such blowers which operate in a hot gas stream.

According to FIGS. 3 and 4, the de-dusting installation is not limited to a cross-flow cooler, but may also be employed in conjunction with a stratifying cooler 3a or a drum cooler 3b, or a combination cooler (not shown). In the examples according to FIGS. 3 and 4, the exhaust air from the particular coolers 3a, or respectively 3b, may be conveyed, as in FIG. 1, to the heat exchanger 12 through the tube conduit 11, and then conveyed further in the usual manner, as shown in FIG. 1.

While there has been shown what is considered to be the preferred embodiment of the invention, it will be obvious that modifications may be made which come within the scope of the disclosure of the specification.

What is claimed is:

1. An installation for the dedusting of hot exhaust air formed during the cooling of products emanating from a cement-, lime-, or dolomite furnace, comprising:
   a product cooler receiving said products being connected to the outlet of said furnace; means for conveying cool air to said product cooler for cooling said products; an exhaust air chamber in said product cooler for removal of hot and dustcontaining exhaust air formed by the heated and dust-enriched air produced during the cooling of the products;
   a regeneratively operating heat exchanger including a rotatable drum having an axis of rotation; a plurality of heat exchange plates in said drum and being rotatable therewith, said plates having large surface areas and heat storage capacities;
   at least one exhaust air conduit extending from said exhaust air chamber and communicating in a direction essentially parallel with said axis of rotation directly with a first half of said heat exchanger for conveying the hot exhaust air from said exhaust air chamber through said conduit into said exchanger and cooling said exhaust air in the latter, wherein the introduced cooling air is heated to a temperature reducing towards the outlet end of said cooler and said at least one exhaust air conduit comprises a plurality of mutually independent tube conduits interconnecting the exhaust air chamber of said cooler at a plurality of locations in axial spacing therealong and connected to said heat exchanger, said tube conduits conveying a plurality of air streams of differing temperatures to said heat exchanger at a plurality of locations spaced along the direction of rotation of said rotatable drum so as to cause the heat exchange surfaces of the plates of said heat exchanger to initially be contacted by the lowest-temperatured and finally by the highest-temperatured exhaust air from said cooler as viewed in the direction of rotation of said heat exchanger;

at least one infeed conduit for cooling air being connected to the other half of said heat exchanger, for conveying cooling air in counterflow to the exhaust air flow in said exhaust air conduit;

a blower connected to said at least one cooling conduit to deliver the cooling air;

a fabric filter; and at least one conduit connecting said heat exchanger with said fabric filter whereby the cooled and still dust-containing exhaust air is conveyed from said heat exchanger through said last-mentioned conduit into said fabric filter for dedusting in the latter further conveyance thereof as purified exhaust air.

2. An installation as claimed in claim 1, comprising an infeed for rinsing air arranged at the said first half of the heat exchanger; and a sealing means arranged at said same half of the heat exchanger for preventing the dust enriched exhaust air from said exhaust chamber to be cooled from being conveyed into said cooling air infeed conduit in counterflow with the dust-enriched air.

3. An installation as claimed in claim 1, further comprising first blower means connected to said fabric filter for further conveyance of the dust-containing exhaust air therefrom as the purified exhaust air.

* * * * *